(No Model.)

J. H. KING.
SAND STRAINER FOR DEEP WELLS.

No. 478,061. Patented June 28, 1892.

Witnesses
Frank S. Davis
David S. Oliver

Inventor
John H. King
By his Attorney Geo. J. Murray

THE NORRIS PETERS CO., PHOTO-LITHO., WASHINGTON, D. C.

UNITED STATES PATENT OFFICE.

JOHN H. KING, OF CINCINNATI, OHIO, ASSIGNOR OF ONE-HALF TO REES W. DUGAN, OF COVINGTON, KENTUCKY.

SAND-STRAINER FOR DEEP WELLS.

SPECIFICATION forming part of Letters Patent No. 478,061, dated June 28, 1892.

Application filed March 21, 1892. Serial No. 425,699. (No model.)

*To all whom it may concern:*

Be it known that I, JOHN H. KING, a citizen of the United States, and a resident of Cincinnati, in the county of Hamilton and State of Ohio, have invented certain new and useful Improvements in Sand-Strainers for Deep Wells, of which the following is a specification.

The object of my invention is to produce a cheap and durable strainer for deep wells. In wells of this class it is necessary to exclude the very fine grains of sand from the well-tube to prevent them from cutting the pump, cylinders, and pistons, and also to prevent them from cutting and enlarging the perforations in the strainer. The perforations in the strainer must, therefore, be very fine, (at least one-thousandth part of an inch,) and the material from which the strainer is constructed must be very hard to prevent the perforations from being enlarged by the exceedingly-fine particles of sand which it is impossible to exclude and admit water, and the shell of the strainer must also have considerable body to resist the pressure brought upon it by the exhausting suction of the pump. I have found by experience that it is impossible to economically slot or perforate metal hard enough and thick enough to resist the abrading effect of the sand-loaded water for any considerable length of time, and it is a very expensive and troublesome operation to remove a worn strainer and replace it by a new one. I have also found that when these old strainers are removed only a comparatively small portion of the perforations have been cut out, while the greater portions are injured but slightly; but the whole strainer is worthless, as there is no means of repairing it. By means of my invention I produce a very strong durable strainer, of the hardest non-corrodible material, made in readily-removable sections, and without the use of saws, milling-heads, or other perforating or puncturing tools, which strainer completely overcomes the defects in prior devices. The means by which I accomplish these results I will first describe in connection with the accompanying drawings, so as to enable any one to make and use the same. I will then specifically point out and claim my invention.

Figure 2:
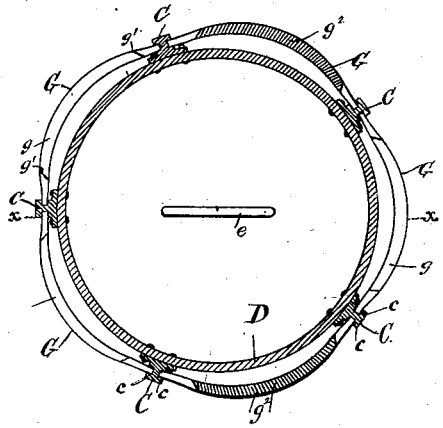
Figure 3:
Figure 4:
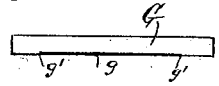
Figure 5:
Figure 1:
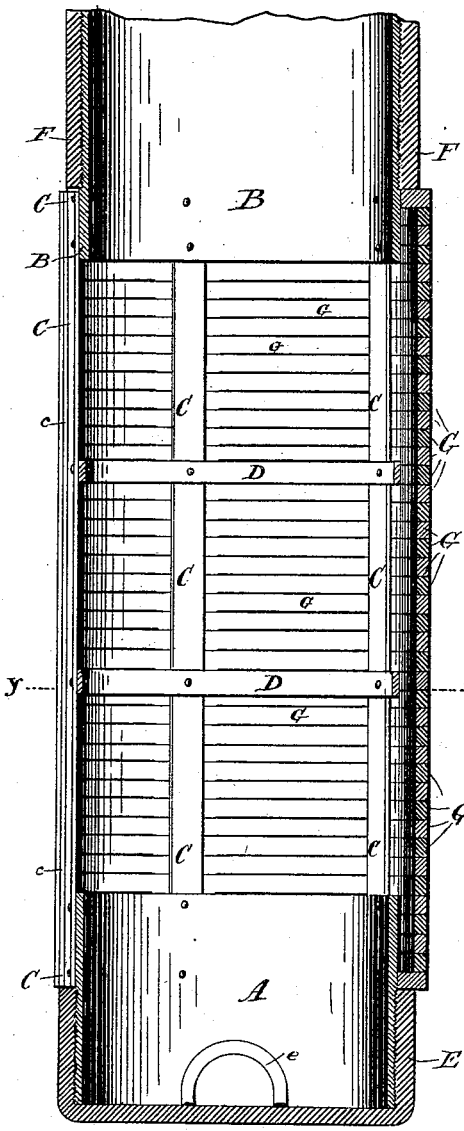

Referring to the drawings, in which like parts are indicated by similar reference-letters wherever they occur throughout the various views, Figure 1 is a diametrical longitudinal sectional view of my strainer, taken through line $x\ x$ of Fig. 2. Fig. 2 is a transverse sectional view taken through line $y\ y$ of Fig. 1. Fig. 3 is an edge elevation of one of the segments of which my strainer is composed. Fig. 4 is a peripheral elevation of the same. Fig. 5 is a central transverse sectional view of one form of the segment.

The frame of my strainer is composed of two tubes A and B, T or channel-iron bars C, uniting the two tubes, and strengthening rings or hoops D, of the same diameter as the tubes A B, upon which the bars C are firmly secured, as they are to the tubes A B. The tubes A B are exteriorly screw-threaded from their ends to the ends of the bars C, which are riveted to them, the lower one A to receive the cap E, in the bottom of which is fitted the customary bail $e$ for convenience in withdrawing the strainer, and the upper one B to receive the interiorly-screw-threaded tube F. The segments or ribs G, I stamp out to the general form shown in Fig. 3 from a sheet of hard-rolled gun-metal, phosphor-bronze, or aluminum-bronze. The thickness of the sheet is from one-sixteenth to three-sixteenths of an inch. After the pieces are stamped to the general form I stamp in suitable dies a depression $g$ in the central portion of the rib, either upon one or both sides, leaving shoulders $g'$, so that when the ribs are placed one upon the other, as seen in Fig. 1, very slight slots or openings are left between the adjacent segments. Instead of forming the single depression in one edge, as shown, one or both edges of the segments may have semicircular depressions or grooves stamped in them to form small openings when they are placed together edge to edge, and when exceedingly-fine openings are required these depressions may be made at an angle to the radii of the shell, as seen at $g^2$, Fig. 2, and at opposite angles upon the upper and lower edges, so that a great number of very fine perforations may be made in the shell of the strainer without weakening it. In strainers which are perforated or slotted there must be at least three-sixteenths of an inch of metal left between the slots or perforations, and small parallel-sided perforations cannot be made through metal one-eighth of an inch thick without great loss from the breaking of cutting-tools. While my ribs may be made of any width desired, I prefer to make them from one-fourth to three-eighths of an inch in width. After the T-iron bars C are secured on the tubes A B and hoops D the channels c are planed true to receive the segments G. The lower cap E is then screwed onto the tube A, the segments G slipped to place one upon the other from the top, and the tube F screwed to place over the tube B and down upon the segments, seating them firmly in their grooves c and holding them in place.

If it is desired to make the openings larger upon the inside than the outside of the shell, this may be accomplished by stamping the segments V-shaped upon the inner edge, as seen at $g^3$, Fig. 5. This construction is also employed when very fine perforations—one three-thousandth part of an inch or less—are desired.

In some situations it is very difficult and often impossible to remove cylindrical strainers, and as all strainers are made of drawn tubing they are necessarily cylindrical; but with my construction the strainer may be made tapering from top to bottom. In such case the tube A and cap E are made of less diameter than the tubes B and F and the lower hoop D less than the upper one. The bars C should also be made heavier, so that the channels c may be cut deeper at the bottom to bring the bottom walls of the adjacent channels parallel to admit sections of the same length.

The principal advantage of my invention is in dispensing with the labor of perforating and slotting the strainer-shell and employing harder and stronger material for the strainer than it is possible to perforate. I do not, therefore, desire to be limited to the particular form of segments shown, nor to the specific means shown and described for holding the segments together, as it is obvious that many mere mechanical changes may be made in both without departing from the spirit or scope of my invention. For instance, if the bars C are made heavy enough the strengthening-hoops D may be omitted.

What I claim as new, and desire to secure by Letters Patent, is—

1. A strainer for deep wells, composed of separate segmental pieces of hard non-corrodible metal, the edges of said pieces being formed to leave strainer-openings between the separate pieces when clamped together and the whole forming a strainer-shell substantially cylindrical, substantially as shown and described.

2. The combination of the frame composed of the tubes A B and channeled bars C, the cap E upon tube A, the separate segments G, placed in the channels of bars C, and the tube F to clamp the segments between it and the cap E, substantially as shown and described.

3. The combination of the tubes A B, the channeled bars C, uniting said tubes, and the hoops D, secured to the channel-bars, the cap E upon tube A, the segments G, depressed upon one edge and adapted to fit in the channels of bars C, and the tube F, screwed upon tube B to hold the segments in place, substantially as and for the purpose specified.

4. The combination, in a deep-well strainer, of the tubes A B, externally screw-threaded, the bars C, uniting said tubes and having their opposite edges provided with channels c, the screw-threaded cap E, screwed upon tube A against the ends of bars C, the segments G, fitted in the channels c, the internally-screw-threaded tube F to force and hold said segments in place, and the hoops D, secured to the base of bars C, substantially as and for the purpose set forth.

JOHN H. KING.

Witnesses:
GEO. B. PARKINSON,
GEO. J. MURRAY.